Sept. 11, 1962 F. J. LOWEY 3,053,350
VEHICLE BRAKE

Filed Feb. 21, 1958 2 Sheets-Sheet 1

INVENTOR.
FRANCIS J. LOWEY
BY Alfred C. Body
ATTORNEY

Sept. 11, 1962 F. J. LOWEY 3,053,350
VEHICLE BRAKE
Filed Feb. 21, 1958 2 Sheets-Sheet 2

INVENTOR.
FRANCIS J. LOWEY
BY
*Alfred C. Boely*
ATTORNEY

United States Patent Office 3,053,350
Patented Sept. 11, 1962

3,053,350
VEHICLE BRAKE
Francis J. Lowey, 1979 Wynwood Drive,
Cleveland 16, Ohio
Filed Feb. 21, 1958, Ser. No. 717,295
16 Claims. (Cl. 188—218)

This invention pertains to the art of vehicle friction brakes and more particularly to an external-band contracting type brake for vehicles.

The invention is particularly applicable to brakes of the type to be mounted on the wheels of an automobile and will be described with particular reference thereto although it will be appreciated that the invention has broader applications.

Automobile brakes normally consist of a metal cylinder or drum having an inwardly facing braking surface engaged by internally expanding brake shoes having a frictional braking material thereon.

Enormous amounts of heat are generated between the friction surfaces which rapidly raises their temperature. This heat flows outwardly from these surfaces at rates and in amounts dependent upon temperature differentials, the heat conductivity and the dimensions of the materials immediately adjacent to the friction surfaces. As the brake lining on the shoes have a poor heat conductivity, almost all of the heat generated must be conducted outwardly through the metal of the brake drum in order to be dissipated. This heat raises the drum to elevated temperatures, and as the drum reaches such elevated temperatures, the heat is dissipated either, and desirably, into the atmosphere or, and undesirably, to other parts of the wheel and brake, either by conduction, radiation, or convection. The heating of the drum and the other parts of the wheel and brake results in various deleterious effects on the operation of the brake.

Thus, as the drum heats, it expands in a direction away from the brake shoes. If the expansion is sufficiently severe or if the brake shoes are badly worn, or both, it is possible for the brake drum to expand beyond the limits of movement of the brake shoe operating mechanism with the result that the shoes no longer can be made to frictionally engage the brake drum.

A further difficulty from such expansion results from the fact that the brake drum is rigidly supported or connected to the wheel at one axial end only and the support restrains the expansion of the drum at this end. The other end of the brake drum is unsupported and more freely expands resulting in a tapered braking surface termed "bell mouthing." Bell mouthing is further aggravated by non-uniform forces of the brake shoes on the brake drum. These forces are usually in just two directions and can reach very high values which force the drum into an elliptical shape.

In either event, the brake shoes resist conforming to these changes and uneven contact pressures and high local heating of the friction material results.

In some instances of severe cases of heating, enough heat is conducted or radiated to the hydraulic operating mechanism for the brake that the fluids therein are heated to the vaporizing temperature in which case the mechanism becomes entirely ineffectual.

In any event, a dangerous result called "fade" often and usually follows after severe and heavy braking efforts.

The present invention, to a large extent, deals directly with these problems.

A still further difficulty with the internally expanding brakes has been in dissipating the generated heat in the brake drum to the surrounding atmosphere. Thus, the drum braking surface faces radially inwardly and its cooling or heat dissipating surface must then of necessity face primarily radially outwardly. Because it is desirable to make the brake drum as large as the wheel will permit, there is little air space between the brake drum and wheel rim through which cooling air can be directed over the outer surface of the brake drum. Radiation of heat to the wheel rim and possible damage to the tire head can result. Furthermore, because of the centrifugal forces on the air itself, directing cooling air onto this outwardly facing cooling surface is difficult without a complicated system of "air plumbing."

While contracting band brakes will obviate some of the above disadvantages, they have never been used heretofore because of the space requirements outside of the brake drum for the band and its operating mechanism, because of dirt problems, and because of the difficulty of cooling or dissipating the generated heat.

The present invention contemplates a new and improved friction brake particularly adapted for automobiles which overcomes all of the above-referred to difficulties, and others, and provides a brake which is simple in construction, positive in operation under even the most severe braking conditions, and is so arranged that the heat generated will not adversely affect the operation of the brake.

In accordance with the present invention, a friction brake of the type to be mounted on the inside of a motor vehicle wheel is provided comprised of a braking drum having an outwardly facing cylindrical braking surface and an inwardly facing cooling surface of a minimum diameter at least equal to 75% of the braking surface diameter and further having a symmetrical transverse cross-sectional shape with the greatest radial thickness in the radial plane through the drum which is located midway between the opposite axial ends of the drum, such that when the drum heats and expands, the braking surface will remain cylindrical. In a slightly more limited aspect, the transverse cross-sectional shape of the drum is such as to provide a principal radial thickness on the radial plane midway between the opposite axial ends of the drum and a pair of inwardly facing cooling surfaces which diverge gradually outwardly from said radial plane to the axial ends of the drum. Cooling fins may also be provided on this inner cooling surface, such fins being on the said radial plane whereby they may also serve as structural reinforcing means for the drum.

Further, in accordance with the invention, the brake drum surrounds and is fastened to a drum supporting hub in such a manner that a minimum of heat will be conducted to the supporting hub.

Still further, in accordance with the invention, the drum supporting hub is so constructed and arranged as to provide a slightly radially-flexible support for the drum whereby to exert a minimum restraint on the expansion and contraction of the drum as it heats and cools.

Still further in accordance with the invention, the brake drum surrounds and is in spaced relationship with a supporting hub and air blowing means are provided for forcing air directly against the inner cooling surface of the brake drum as the hub and drum revolve and/or flushing out wear or dirt particles.

Still further in accordance with the invention, the arrangement is such that the cooling air first flows over and around the wheel bearings and/or the hydraulic mechanism whereby to prevent overheating thereof, the air path being such that a minimum or no dirt or moisture is carried into the brake by the air.

Still further in accordance with the invention, heat shields are provided to prevent radiation of heat from the brake drum to the other parts of the brake.

Still further in accordance with the invention, a brake is provided comprised of a brake drum having an outwardly facing braking surface, a brake band surrounding and normally in spaced relationship with the braking surface and operating levers for moving the ends of the band along a line of movement such that the entire band will simultaneously engage and/or disengage the drum braking surface.

Further in accordance with the invention, the operating levers each have an outer end extending over the outer surface of the brake band and so constructed and arranged as to require a minimum of radial space while having a maximum rigidity in the direction of the actuating forces.

The principal object of the invention is the provision of a new and improved automobile brake which is simple in construction, has improved operating characteristics and is economical to manufacture.

Another object of the invention is the provision of a new and improved automobile brake which for a given maximum over-all diameter has a maximum diameter of braking surface.

Another object of the invention is the provision of a new and improved automobile brake which for an equivalent area of braking surface has a minimum of rotating mass.

Still another object of the invention is the provision of a new and improved automobile brake wherein the brake drum during braking is under uniform radial and circumferential compression and the material therefore may be primarily selected for its frictional characteristics rather than strength characteristics.

Still another object of the invention is the provision of a new and improved automobile brake having a brake drum so dimensioned and supported that the braking surface thereof will remain cylindrical even under severe heating.

Still another object of the invention is the provision of a new and improved automobile brake having a maximum diameter braking surface and means for directing cooling air onto the braking drum with a maximum degree of effectiveness.

Still another object is to provide a cooling arrangement for an automobile brake which also cools the hydraulic operating mechanism and/or the wheel supporting bearings, and/or the wheel supporting rim.

Another object of the invention is the provision of a new and improved arrangement for directing the ends of a brake band into engagement with an internal brake drum such that the brake band will simultaneously engage the brake drum over its entire circumference both when new and when worn.

Another object is the provision of a new and improved arrangement for forcing an external brake band into engagement with the brake drum which occupies a minimum of space outwardly of the band.

Still another object of the invention is the provision of a new and improved automobile brake wherein the heat dissipating surfaces are completely enclosed and will remain clean even after operation in extremely dirty conditions.

Still another object of the invention is the provision of a new and improved forced air cooling arrangement for an automobile brake which does not require additional space and does not add weight to the brake.

Still another object of the invention is the provision of a new and improved automobile brake wherein the hydraulic operating mechanism and the wheel supporting bearings are shielded from direct radiation of heat from the braking drum.

The invention may take physical form in certain parts and arrangements of parts, a preferred embodiment of which will be described in detail in this specification and illustrated in the accompanying drawings which form a part hereof and wherein.

Figure 1:
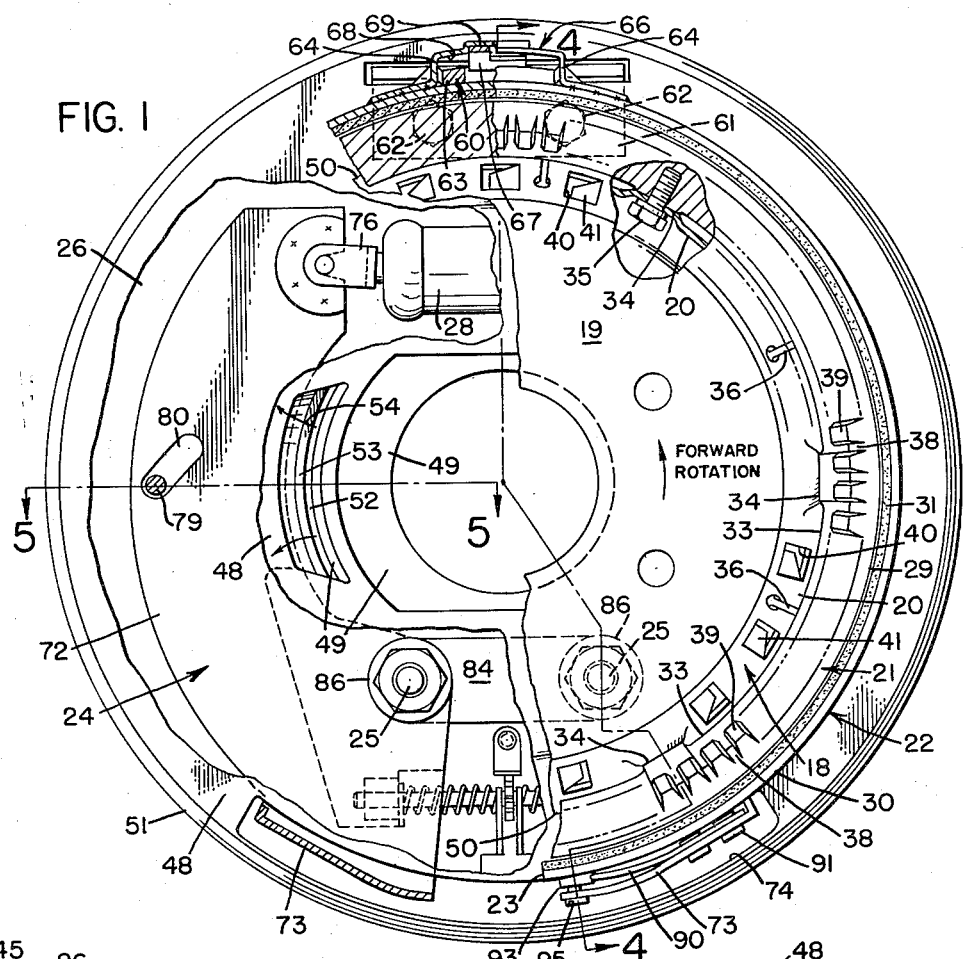
FIGURE 1 is a front side elevational view, with portions broken away generally on the line 1—1 of FIGURE 2 of an automobile brake illustrating a preferred embodiment of the invention, the brake being shown in the retracted or unengaged position.
Figure 3:
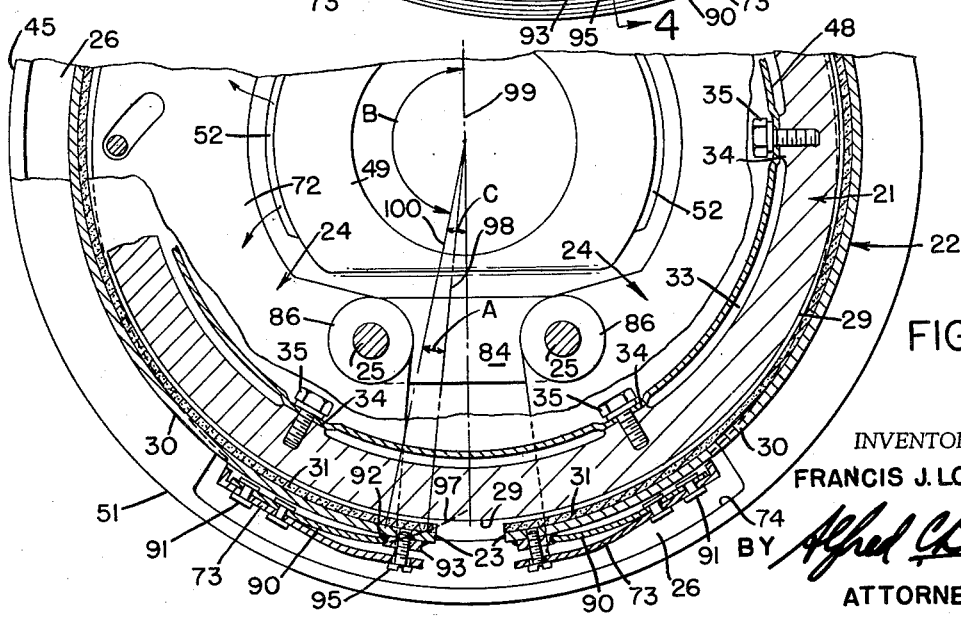
FIGURE 3 is a fragmentary side cross-sectional view of FIGURE 2 taken on the line 3—3 showing in detail the brake band operating mechanism.
Figure 2:
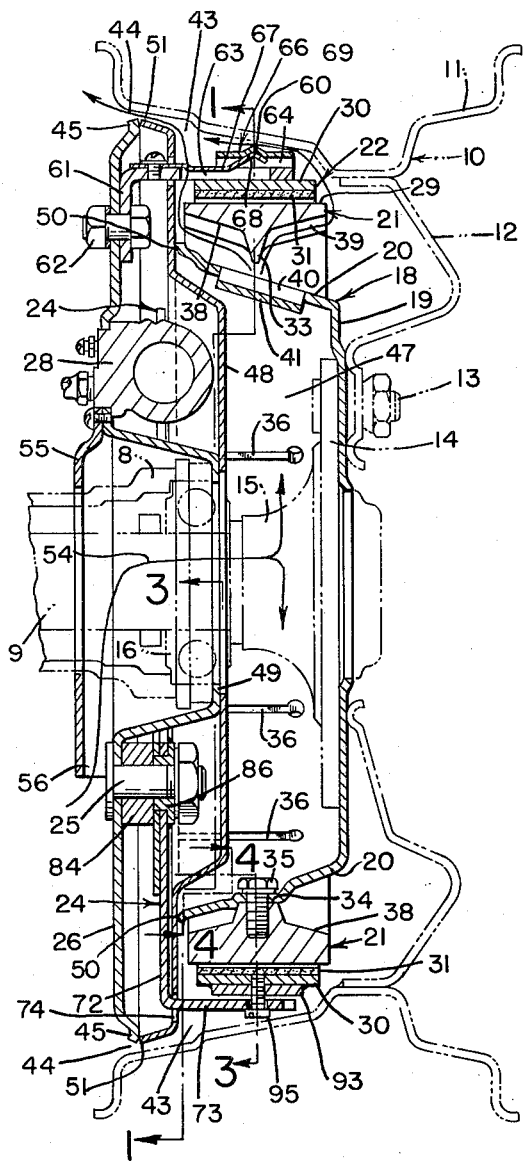
FIGURE 2 is a side cross-sectional view of FIGURE 1 taken approximately on the line 4—4 thereof with the wheel axle, axle hub and wheel shown in phantom lines.
Figure 4:
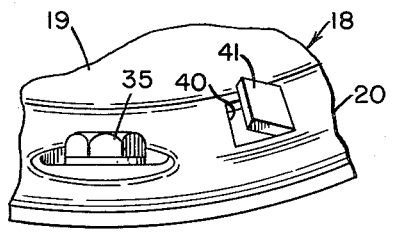
FIGURE 4 is a fragmentary side view of portions of FIGURE 1 showing the air scoops for directing the cooling air onto the brake drum, taken on line 4—4 of FIGURE 2.

Referring now to the drawings wherein the showings are for the purposes of illustrating a preferred embodiment of the invention only, and not for the purpose of limiting same, FIGURE 2 shows, in phantom, an automobile wheel 10 comprised generally of an outer rim 11 and an inner disc 12 removably mounted by means of studs and nuts 13 on a radially extending flange 14 of a wheel hub 15. This wheel hub in turn is mounted on an axle 9 rotatably supported in a roller bearing 16 mounted in an axle housing 8.

A brake drum supporting hub 18 has a radial flange 19 removably fixed as by bolts not shown to the wheel hub flange 14 and a flange 20 extending generally outwardly and in an axial direction on which a brake drum 21 is mounted.

The brake drum 21 is surrounded by a radially contracting brake band 22, the ends 23 of which are moved towards each other in order to contract the band by means of a pair of actuating levers 24 pivotally supported on pivot pins 25 in turn mounted on a back plate 26 fastened to the axle housing 8.

The actuating arms 24 are operated by a hydraulic mechanism 28 also mounted on the back plate 26.

The brake drum 21 has an outwardly facing cylindrical braking surface 29 of a width which when considered with the diameter thereof provides the desired area of braking surface. The brake band 22 is comprised of an outer band of metal 30 and an inner band or layer of frictional material 31, which engages the braking surface 29 to exert a braking action thereagainst. The heat generated by such braking action raises the temperature of the engaging surfaces. As the friction material 31 has a relatively poor heat conductivity, most of the heat must be dissipated by flowing radially inwardly in the brake drum 21, and in accordance with the present invention, the cross-sectional shape dimensioning and mounting of the brake drum 21 are such as to minimize the distortions of the braking surface 29 from a true cylinder.

Thus, the brake drum 21 has a transverse cross-sectional shape which is symmetrical about the radial plane therethrough which is located midway between its opposite axial ends and in the preferred embodiment is such as to provide a radially inwardly and circumferentially extending rib 33 on said radial plane, the outer surfaces of which diverge radially outwardly and symmetrically to the axial ends of the drum 21. Furthermore, the drum 21 is mounted on the drum supporting hub 19 so that the points of fastening are located on this axial midplane. Thus, in the embodiment shown, the rib 33 has a plurality of circumferentially spaced flats 34 corresponding to flats on the flange 20 and bolts 35 extend through the flange 20 into the drum 21 securing the two permanently together. Obviously the flange 20 on the hub could be welded to the brake drum, preferably on the radial plane through the brake drum located midway between the opposite axial ends of the brake drums.

It is to be noted that the drum supporting hub only engages the brake drum 21 at these circumferentially spaced points, and is otewise radially spaced therefrom by which arrangement, in accordance with the invention, a minimum amount of heat will be conducted to the supporting hub 18. Obviously heat insulating means could be provided in the form of a non-metallic washer between the hub 18 and the drum 21 to prevent any metal to metal contact between the two, and thus reduce the conduction of heat to the hub 18 to a minimum.

Further in accordance with the invention, the hub 18 is so arranged as to provide a slight degree of radial flexibility such that the drum 21 may expand and contract with a minimum restraint imposed by the hub 18. In the embodiment of the invention shown, this is accomplished by means of the flange 20 extending generally at a sharp angle of from 90–135° relative to the flange 19. If additional flexibility is required, axial slots 36 opening to the outer end of the flange 20 may be provided.

It is further to be noted that the radially inwardly facing surface 38 of the brake drum 21 is a cooling surface from which the heat generated by the braking action can be dissipated. To increase the heat radiating surface, a plurality of fins 39 may be provided which fins 39 extend in an axial direction. As such, they not only increase the area of the cooling surface very substantially, but they also serve as structural members supporting the outer edges of the brake drum and transmitting the forces imposed thereon to the center plane for transmittal to the supporting hub 18. By this arrangement, greater rigidity of the brake drum 21 across the braking surface 29 results and thus the tendency to distort is further reduced.

In this respect, and to further reduce the tendency or possibilities of the braking surface 29 to distort, the inner diameter of the brake drum 21 is at least 75%, and preferably 85%, of the diameter of the braking surface 29. By this limitation, a two-fold result follows, namely, the radial thickness of the drum 21 is sufficiently small that substantially all portions of the drum will be heated to approximately the same temperature. Thus, temperature differential distortions are eliminated. Furthermore, the rib 33 does not have sufficient radial rigidity to prevent expansion of the axial mid-portions of the braking surface 29 while permitting radial expansion of the axial ends thereof.

Further in accordance with the invention, means are provided for directing a high velocity of air directly onto the cooling surface 38. While such means may take a number of different forms in the embodiment of the invention shown, the flange 20 has a plurality of openings 40 therethrough, with an air scoop 41 arranged to force air through the opening 40 directly onto the surface 38. In the embodiment of the invention shown, the openings 40 and the scoops 41 are formed by shearing a tongue from the flange 20 and bending such tongue radially inwardly such that the free end of the tongue faces in the direction of forward rotation of the wheel 10. With this arrangement, the scoops 41 scoop up air and force it radially outwardly directly onto the rib 33 where it divides and flows generally in both axial directions along the surfaces 38 and the cooling ribs 39, thence radially outwardly into the space 43 just inwardly of the wheel rim 11 and thence in to the free air through the space 44 between the wheel rim 11 and the outer edge 45 of the back plate 26. The cooling air thus cools the brake drum 21 and the wheel rim 11.

A shield plate 48 is fastened at its inner edge to the inner periphery 49 of the back plate 26 and its outer edge 51 engages the outer edge 45 of the back plate 26, and is otherwise in spaced relationship thereto to provide a heat and dirt shield separating the hydraulic mechanism 28 and the operating arms 24 from the brake drum 21 and the cooling blades 41. The free end 50 of the flange 20 is close spaced to the shield plate 48 providing a substantially closed chamber 47 inwardly of the blades 41 and preventing the circulation of air around the end 50. A rotating seal could be employed if desired or necessary. It is to be noted that the flange 20 and the shield plate 48 protect the hydraulic mechanism and the operating arms 24 from the direct radiation of heat from the brake drum 21, and also separate them from the chamber 47 through which cooling air with its contaminants is circulated.

Figure 5:
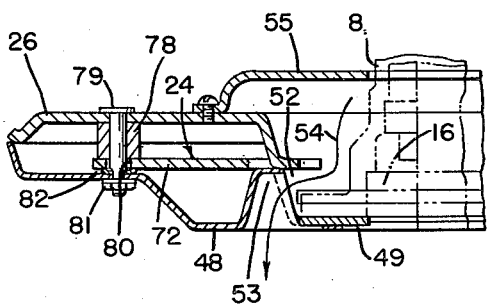
FIGURE 5 is a fragmentary cross-sectional view of FIGURE 1 taken approximately on the line 5—5 thereof.

The cooling air which the scoops 41 blow outwardly from the chamber 47 is replaced in accordance with the invention, in such a manner that the fresh air coming in first flows over the axle housing 8 and the wheel bearings 16. Thus, the back plate 26 and the shield plate 48 (see FIGURE 5) are provided with circumferentially extending slots 52, 53, respectively, through which the cooling air flows in a path as indicated by the arrow 54.

In order to prevent this inflow of cooling air from carrying with it dirt and moisture, a dirt shield 55 is provided, fastened at its upper edges and side edges to the back plate 26, but spaced from the back plate 26 at its lower edge to provide a downwardly facing air port 56. Thus, dirt and water must follow a tortuous path in order to enter the chamber 47. The shield 55 may be arranged so that the port 56 faces in the direction of forward motion so that the shield 55 acts as an air scoop.

It is to be noted that by virtue of the wheel disc 12, and the other construction as shown, the cooling surfaces 38 of the brake drum 21 are completely shielded from any dirt or the like splashing directly thereon, and will thus remain substantially clean through continued use under adverse conditions so that the surfaces 38 may always have the maximum efficiency of heat dissipation.

It is to be noted that the arrangement for brinigng the cooling air into the brake over the various operating parts of the wheel, and then directing the air in a direct blast onto the cooling surface and then continuing the air on outwardly where it can continue to cool parts of the wheel rim is considered to be an important part of the present invention.

Furthermore, the provision of the heat shield 48 and flange 20 prevent the direction radiation of heat under the hydraulic mechanism 28 as well as onto the bearings 16 is also considered to be an important part of the successful operation of the brake with the present invention.

The brake band 22 may be of any known or desired construction, either all metal or as shown of an outer metal band 30 and an inner layer 31 of conventional friction material. The purpose of the metal band 30 is primarily to transmit the tension forces imposed on the brake band 22 during braking operations. Preferably, in accordance with the invention, the brake band 22 is as flexible as possible, and the metal band 30 is kept as thin as possible.

The brake band 22 is held against rotation with the drum 21, when in frictional engagement therewith, by means of an L-shaped bracket member 60 having one of its legs 61 fastened to the back plate 26 in any suitable manner, for example, the nut and bolt 62, and the other of its legs 63 extending axially outwardly over the upper surface of the band 22, and between the legs 64 of an inverted U-shaped bracket 66 fastened to the outside of the metal band 30. A spring member 67 biased upwardly engages the under side of the base 68 of the bracket 66, and urges the band upwardly against the force of gravity to prevent any tendency of the band 22 to sag against the brake drum 21 when no braking action is desired. This spring 67 also has means for aligning the brake band 22 axially relative to the brake drum 21. In the embodiment shown, the spring 67 and the base 68 of the bracket 66 have cooperating wedge surfaces 69 extending in a circumferential direction for this purpose. The spring 67 also performs the function of preventing the brake band 22 from rattling when the wheel is subjected to bumps and the like.

The bracket 66 and the bracket 60 are shown as being located midway between the ends 23 of the brake band 22 so that, as will appear, one-half of the brake band when engaged with the brake drum 21 will be self energizing. If the degree of self-energizing is to be varied, the location of the bracket 60 relative to the ends 23 may be varied as desired.

For the purpose of moving the ends 23 towards each other, and thus engaging the brake band 22 with the brake drum 21, the operating levers 24 are provided which operating levers, as will appear, are so constructed as to occupy the minimum radial distance outwardly of the brake band 22 at a maximum of rigidity. The levers 24 are so mounted as to have the maximum resistance against twisting.

The levers 24 are identical to each other except for being rights and lefts and the description of one should suffice for both. Thus, each lever 24 is formed preferably by stamping from a flat sheet of metal to provide a portion 72 generally flat in a radial plane and having a substantial radial width. This portion 72 is located in the radial plane beyond the axial end of the brake drum 21 and separated from the drum by means of the heat shield 48. The lever 24 also includes a circumferentially-wide axially-extending portion 73 which passes through an opening 74 in the shield plate 48 over and in close spaced relationship with the outer surface of the brake band 22 adjacent to but spaced from the ends 23.

The portion 72 extends generally circumferentially and the hydraulic mechanism 28 has a connecting rod 76 which engages the end remote from the portion 73 thereof for the purpose of actuating the brake band 22.

These arms or levers 24 are so mounted as to resist the forces imposed thereon with a minimum amount of twisting. Thus, at a point substantially spaced from the pivot pins 25, support means are provided for the arm 72. In the embodiment shown, such support means comprise a sleeve 78 extending between the back plate 26 and the arm 72 which sleeve 78 is held in position by means of a pin 79 extending through the sleeve 78, a slot 80 in the arm 72, and an opening in the heat shield 48 where the pin 70 is held in position by means of a nut 81. A small spring 82 interposed between the shield 48 and the arm 72 biases the arm 72 into sliding engagement with the end of the sleeve 78. It will be noted that the slot 80 is either arcuate or tangent to the circle having a center of radius corresponding to the pivot pin 25.

Thus, forces imposed on the arm portion 73 when it is desired to actuate the brake, and which are offset from the plane of the arm 72, exert a twisting action on the lever 24. Such twisting action is resisted by the sleeve 78.

Further, to resist the very substantial forces which are imposed on the levers 24, a link member 84 is provided through which both pivot pins 25 extend.

A bushing 86 surrounds the pin 25 and pivotally supports the arm 24 on this pin 25. Additionally, it is to be noted that the operating levers, by virtue of the construction described, are light in weight with a maximum of rigidity in the direction of the actuating force, resulting in reduced cost of manufacture, reduced unsprung weight, and a minimum of axial space.

The operating levers 24 are so arranged with the brake band 22 that the brake band 22 will engage and disengage the braking surface 29 simultaneously over its entire length, and this result will hold for all degrees of wear of the friction material 31.

In the embodiment of the invention shown, the operating levers 24 actuate the band 23 through a compression member 90. This member may take a number of different forms and may be mounted in a number of different ways. In the embodiment shown, it is in the form of a leaf spring fastened at one end to the inner surface of the axial extending portion 73 by any suitable means, such as the rivets 91, and at the opposite end is curved to pivotally engage a similar curved circumferentialy facing thrust surface 92 on the edge of a thrust block 93 suitably fastened as by welding to the outer surface of the brake band immediately adjacent the end 23. The member 90 may tend to buckle when substantial compression forces are placed thereon. In such case it buckles into engagement with the rigid arm 73. The member 90 is also biased at its band end in a radially inward direction, and this bias is resisted by an adjusting screw 95 extending radially inwardly through an opening in the end of the axially extending portion 73 into a threaded opening in the thrust block 93. By use of the screw 95, the spacing of the ends 23 from the braking surface 29 in the non-engaged position may be readily adjusted. Also the screw 95 provides the function of retracting the ends 23 from the braking surface 29 when it is desired to release the brakes.

The braking action, however, is applied through the resilient member 90 acting on the curved surface 92. In effect, this is a pivoted driving connection. No pivot pin with its resulting radial bulk is required, however.

It will be appreciated that the ends 23 must be moved in both a radial and a circumferential direction in order to bring the brake band 22 into engagement with the braking surface 29, the resultant of these two movements being indicated by the path of movement 97.

In accordance with the invention, the path of movement 97 is so selected that the entire brake band comes into and out of pressure contact with the braking surface simultaneously. Obviously if the path of movement is too parallel to the brake surface, the end 23 will not engage the braking surface. If the path of movement 97 is too steep, that is, too radial, the end 23 will engage the surface first. In either event, uneven braking pressures and uneven wear result.

The path of movement 97 of the center of the curved surface 92, where the braking thrust is delivered to the brake band, must be controlled within very close limits, defined by the formula $A = B(1-R)/(R+r)$ wherein; $B$ = the angle between the radial line 98 through the center of curvature of surface 92 when the band first engages the braking surface 29, and the line 99 through the center line of the bracket 60; the angle $A$ = the angle between the line 98 and the line 100 as the surface 92 is retracted from the line 98; $R$ = the diameter of the braking surface 29, and $r$ = the radial movement of the point 92 as the brake band is retracted or advanced.

The path of movement 97 may be further defined in rectangular coordinates by the formulas $$X = \text{tangent } (C+A)Y$$

and $y = \text{cotangent } (C+A)X$ where $C = 180° - B$. The desired path of movement may be obtained in any one of a number of different ways, but in the preferred embodiment, the location of the pivot pins 25 is so selected as to be either the center of curvature of the path of movement 97, or as close thereto as possible so that for the short arc of movement of the end 23, the arc having a center on the pivot pin 25 will almost exactly coincide with the path of movement 97.

If any error in the line of movement 97 is to be allowed, it should be in favor of having the ends 23 engage the drum first whereby any dust or dirt on the braking surface 29 will be brushed off.

It is to be further noted that with such error, the resilient thrust arms 90 will flex slightly to allow for any discrepancies as the ends 23 are brought into engagement with the brake drum 21. The arms 90 in effect form a pivoted connection to the ends 23. Also, by virtue of the portions 73 being radially outside of the thrust arms 90, if thrust pressures are reached, sufficient to buckle the arms 90, they simply move into supporting engagement with the inner surface of the portions 73.

Thus it will be seen that a vehicle brake has been described in detail which accomplishes all of the objectives heretofore set forth, and others, and provides a brake wherein the operating parts of the wheel are protected from the heat generated wherein the heat generated is rapidly conveyed away by circulating air where such circulating air also cools other portions of the wheel where the brake drum will be distorted to the minimum, if at all, where even braking pressure will exist over the entire brake band a maximum diameter of braking drum surface is provided wherein there is a minimum of unsprung weight and a maximum of strength. The invention has been described with reference to a preferred embodiment in sufficient detail to enable one skilled in the art to readily duplicate the invention. Obviously modifications and alterations differing radically from the exact embodiment shown will occur to others upon the reading and understanding of this specification, and it is my intention to include all such modifications and alterations insofar as they come within the scope of the appended claims.

Having thus described my invention, I claim:

1. In an automobile brake, an annular brake drum supporting hub, a brake drum having an outwardly facing cylindrical braking surface, an inwardly facing annular cooling surface, said cooling surface being comprised of faces diverging outwardly to the axial ends of said drum from the radial midplane through the drum, and fasteners connecting the inner periphery of the cooling surface to the outer periphery of the brake drum supporting hub at circumferentially spaced points said cooling surface spaced from said hub at the positions between said fasteners to thereby minimize the transfer of heat from the brake drum to the supporting hub.

2. The combination of claim 1 wherein each of said faces have a plurality of circumferentially spaced fins thereon extending in a direction generally perpendicular to said radial midplane.

3. The combination of claim 1 wherein the internal diameter of said cooling surface is at least 75% of the external diameter of said braking surface to allow better heat dissipation and accommodate flexing of the brake drum.

4. In an automobile brake, an annular brake drum supporting hub, a brake drum having a cylindrical radially outwardly facing braking surface and a cross-sectional shape such as to provide on its radially inwardly facing surface a generally circumferentially extending rib on the radial midplane through the drum with the sides of said rib diverging from each other in a radially outward direction, a plurality of circumferentially spaced flats on the inner periphery of said rib, and fasteners connecting said flats to the outer periphery of said brake drum supporting hub whereby the area of contact between the supporting hub and the brake drum is minimized.

5. The combination of claim 4 wherein the sides of said rib have a plurality of circumferentially spaced fins extending perpendicular to said radial midplane of the drum.

6. A forced air cooled vehicle wheel brake comprising, in combination, a brake drum having a cylindrical outwardly facing braking surface and an inwardly facing cooling surface, a disc-like fixed back plate having a diameter greater than that of said braking surface and being axially offset from said drum, a disc-like fixed heat shield between said back plate and said brake drum with the heat shield having an outer diameter greater than said brake drum and being axially spaced from said back plate to provide a first chamber, said first chamber adapted to receive a brake band actuating means, a disc-like rotatable brake drum supporting hub fastened to said brake drum and axially spaced from the heat shield to define a second chamber, and means mounted on said hub for forcing cooling air radially from said second chamber onto the inwardly facing cooling surface of said brake drum.

7. A forced air cooled vehicle wheel brake comprising, in combination, a brake drum having a cylindrical outwardly facing braking surface and an inwardly facing cooling surface, a disc-like fixed back plate having a diameter greater than that of said braking surface and being axially offset from said drum, a disc-like fixed heat shield between said back plate and said brake drum having an outer diameter greater than said brake drum and being axially spaced from said back plate to provide a first chamber, a disc-like rotatable brake drum supporting hub fastened to said brake drum and axially spaced from the heat shield to define therewith a second chamber, means mounted on said hub for forcing cooling air radially from said second chamber onto the inwardly facing cooling surface of said brake drum, and said first chamber adapted to receive operating levers pivotally supported on said back plate.

8. A forced air cooled vehicle wheel brake comprising, in combination, a brake drum having an outwardly facing cylindrical surface, a disc-like back plate axially spaced from said drum and extending radially therebeyond, a disc-like fixed heat shield in axially spaced relationship with said back plate to define a first chamber with the shield extending radially beyond said drum, a disc-like rotatable brake drum supporting hub axially spaced from said heat shield and including a radially extending portion and an outer generally axially extending portion interior of said drum, means fastening said drum to said axially extending portion at circumferentially spaced points, said axially extending portion being otherwise radially spaced from said drum and having a plurality of passages therethrough opposite said drum, and means for forcing air radially through said passages.

9. In an automobile wheel brake, a brake drum having an outwardly facing cylindrical braking surface, an inwardly facing cooling surface, a supporting hub for said drum comprising a disc portion adapted to be mounted on a wheel hub and extending generally radially outwardly therefrom and a flange portion extending generally axially at an angle of between 90–135° from said disc portion and means fastening said brake drum to said flange portion at a point spaced axially from said disc portion, said fastening means being circumferentially spaced and said flange portion having axially extending slots between said fastening means.

10. An automobile brake, a brake drum having an inwardly facing cylindrical braking surface and an annular inwardly facing cooling surface, said cooling surface having a plurality of spaced attaching areas facing radially inwardly and a separate brake drum supporting hub extending into said drum near said cooling surface and having a plurality of spaced attaching areas facing radially outwardly, said hub being fastened to said cooling surface at a plurality of circumferentially spaced points defined by the attaching areas of the cooling surface and the hub, said spaced points located in a plane substantially midway between the axial ends of said drum, said hub being otherwise spaced from said cooling surface to insulate the cooling surface from said hub, thus reducing the heat conductivity between the cooling surface and the hub.

11. The combination of claim 10 wherein said hub has means thereon for forcing air outwardly against said cooling surface as said hub and drum rotate.

12. An automobile brake, a brake drum having an outwardly facing cylindrical braking surface and an annular inwardly facing cooling surface, a brake drum supporting hub extending into said drum near said cooling surface and fastened to the inner periphery of said cooling surface at a plurality of circumferentially spaced points, said spaced points being located in a plane substantially midway between the axial ends of said drum, said hub having a plurality of openings therethrough radially aligned with said cooling surface and a plurality of air scoops facing in the direction of forward rotation adjacent said openings whereby to force air through said openings onto said cooling surfaces as said wheel rotates.

13. An automobile wheel brake, a brake drum having an outwardly facing cylindrical braking surface and an inwardly facing cooling surface, a support hub for said drum having a disk portion adapted to be mounted on a wheel hub extending generally radially outward therefrom and a flange portion extending generally axially into said drum at an angle of between 90–135 degrees from said disk portion and means inwardly of said drum fastening said brake drum to said flange portion at a point spaced from said disk portion, said fastening means comprising a number of widely separated joints located in a plane substantially midway between the axial ends of said drum, said flange being otherwise spaced inwardly from said drum.

14. An automobile wheel brake comprising in combination a brake drum having an outwardly facing cylindrical braking surface and an inwardly facing cooling surface so shaped as to define a circumferentially extending rib on the radial plane through the drum which is located midway between the opposite axial ends of said drum, and a brake drum supporting hub having an axially extending flange portion fastened to said rib at a plurality of circumferentially spaced points, the portion of said flange between said points being spaced from said rib to insulate the cooling surface from said hub thus reducing the heat conductivity between the cooling surface and the hub.

15. The combination of claim 14 wherein said flange portion has a plurality of openings opposite said rib and means for forcing air through said openings onto said rib.

16. An automobile brake comprising, a brake drum having a cylindrical radially outwardly facing braking surface and an inwardly facing cooling surface, said cooling surface having a plurality of spaced fins, a separate brake drum supporting hub extending into said drum, means for connecting said hub to said drum, said means being located in a plane extending through the axial midpoint of said drum, and the internal diameter of said cooling surface being at least 75% of the external diameter of said braking surface to allow better heat dissipation and accommodate flexing of the brake drum.

References Cited in the file of this patent

UNITED STATES PATENTS

| | | |
|---|---|---|
| 1,534,538 | Norris | Apr. 21, 1925 |
| 1,695,194 | Lansinger | Dec. 11, 1928 |
| 1,764,177 | Loughead | June 17, 1930 |
| 1,922,318 | Mulder | Aug. 15, 1933 |
| 1,990,746 | Nelson | Feb. 12, 1935 |
| 2,133,597 | Tjaarda | Oct. 18, 1938 |
| 2,274,503 | Reid | Feb. 24, 1942 |
| 2,422,462 | Ash | June 17, 1947 |
| 2,773,552 | Schjolin et al. | Dec. 11, 1956 |
| 2,889,173 | Miller | June 2, 1959 |
| 2,903,099 | Nelson | Sept. 8, 1959 |

FOREIGN PATENTS

| | | |
|---|---|---|
| 664,682 | France | Apr. 23, 1929 |
| 794,344 | France | Feb. 13, 1936 |
| 148,000 | Great Britain | July 26, 1920 |
| 224,110 | Great Britain | Nov. 6, 1924 |
| 448,261 | Great Britain | June 4, 1936 |